United States Patent [19]

Frisch et al.

[11] Patent Number: 5,091,436
[45] Date of Patent: Feb. 25, 1992

[54] REINFORCED FOAM COMPOSITES COMPRISING HYDROXY-CONTAINING VINYL ESTER RESIN

[76] Inventors: Kurt C. Frisch, 17986 Parke La., Grosse Ile, Mich. 48138; Kaneyoshi Ashida, 28139 New Bedford, Farmington Hills, Mich. 48018

[21] Appl. No.: 482,298

[22] Filed: Feb. 20, 1990

[51] Int. Cl.$^5$ .............. C08G 18/04; C08G 18/68; B32B 5/20; B32B 27/28
[52] U.S. Cl. .............. 521/137; 428/306.6; 428/308.4; 428/311.5; 428/316.6; 428/317.9; 428/319.1; 428/423.1; 428/423.3; 428/425.5; 428/425.6
[58] Field of Search ............ 428/308.4, 316.6, 317.9, 428/319.1, 423.1, 423.3, 425.5, 425.6, 311.5, 306.6; 521/137

[56] References Cited

U.S. PATENT DOCUMENTS

| | | | |
|---|---|---|---|
| Re. 28,715 | 2/1976 | Stamberger | 521/137 |
| 3,075,926 | 1/1963 | Stewart et al. | 521/137 |
| 3,301,743 | 1/1967 | Fekete et al. | 523/523 |
| 3,373,075 | 3/1968 | Fekete et al. | 156/330 |
| 3,404,106 | 10/1968 | Bearden et al. | 521/137 |
| 3,700,752 | 10/1972 | Hutchinson | 525/454 |
| 3,741,917 | 6/1973 | Morehouse | 521/112 |
| 3,773,697 | 11/1973 | Olstowski | 524/775 |
| 3,824,201 | 7/1974 | McGranaghan et al. | 523/527 |
| 3,860,537 | 1/1975 | Graham et al. | 521/55 |
| 3,876,726 | 4/1975 | Ford, Jr. et al. | 525/28 |
| 3,876,728 | 4/1975 | Kuroda et al. | 525/28 |
| 3,886,229 | 5/1975 | Hutchinson et al. | 525/28 |
| 3,933,728 | 1/1976 | Henbest | 523/512 |
| 4,098,733 | 7/1978 | Olstowski et al. | 521/123 |
| 4,125,487 | 11/1978 | Olstowski | 521/137 |
| 4,128,600 | 12/1978 | Skinner et al. | 528/75 |
| 4,181,781 | 1/1980 | Chandalia et al. | 521/137 |
| 4,289,684 | 9/1981 | Kallaur | 525/28 |
| 4,302,553 | 11/1981 | Frisch et al. | 525/28 |
| 4,365,024 | 12/1982 | Frentzel | 521/114 |
| 4,386,166 | 5/1983 | Peterson et al. | 521/99 |
| 4,418,158 | 11/1983 | Frentzel | 521/115 |
| 4,481,307 | 11/1984 | Frentzel | 521/115 |
| 4,539,339 | 9/1985 | Cuscurida et al. | 521/137 |
| 4,539,378 | 9/1985 | Cuscurida et al. | 521/137 |
| 4,555,442 | 11/1985 | Frentzel | 428/318.4 |
| 4,581,384 | 4/1986 | Marion | 521/110 |
| 4,680,214 | 7/1987 | Frisch et al. | 428/107 |

OTHER PUBLICATIONS

Journal of Cellular Plastics, 18, No. 2, pp. 121-128 (1982), "RIM Systems from Interpenetrating Polymer Networks".

International Progress in Urethanes, vol. 2, pp. 85-97 (1980), "Glass Fiber Reinforced Rigid Polyurethane Foam (Elson Neo-Lumber FFU ®)".

T. J. Hsu and L. J. Lee, Proceedings, ANTEC'85, pp. 1304-1308, "Polyurethane-Polyester IPN in Reactive Polymer Processing".

(List continued on next page.)

Primary Examiner—Maurice J. Welsh
Assistant Examiner—Rabon Sergent
Attorney, Agent, or Firm—Gordon W. Hueschen

[57] ABSTRACT

There is disclosed a polyurethane/unsaturated polyester hybrid foam of the rigid type prepared from novel components including not only polyol and polyisocyanate but also a unique hydroxy-containing vinyl ester and vinyl monomer, optionally together with an additional polar vinyl monomer, all together providing the necessary components for a hybrid polyurethane-polyvinyl ester matrix, which mixture of components before foaming is capable of having suspended therein fillers and reinforcing fibers to produce a foam or reinforced foam composite having a density between about 20 and 100 pounds per cubic foot. The reinforced foam can be made into baords and the like and advantageously has continuous fiberglass strands or yarn disposed longitudinally in or adjacent the surface skin of the foam. The strands or yarn are preferably parallel and close together and are preferably flattened out in the foam-forming process so that the surfaces have a continuous fiberglass implant longitudinally and substantially so transversely. One preferred structural composite is illustrated in the drawings.

53 Claims, 1 Drawing Sheet

OTHER PUBLICATIONS

Y. S. Yang and L. James Lee, Macromolecules 1987, 20, pp. 1490–1495, "Polymerization of Polyurethane-Polyester Interpenetrating Polymer Network".

H. R. Edwards, Modern Plastics, May 1987, pp. 66–74, "Polyester/Urethane Hybrids are Suited for Conventional Molding".

W. N. Reed and J. J. Matous, Proceedings, 40th Annual Conference, Reinforced Plastics/Composites Institute, The Society of the Plastics Industry, Inc., Jan. 28–Feb. 1, 1985, Section 9-C, pp. 1–5—"A Step Beyond with IPN's".

H. R. Edwards, Proceedings, 42nd Annual Conference, Composites Institute, The Society of the Plastics Industry, Inc., Session 8-C, pp. 1–6, "The Application of Isophthalic Unsaturated Polyester Urethane Hybrids in Conventional Molding Techniques", Feb. 2–6, 1987.

T. J. Hsu and L. J. Lee, Proceedings, 42nd Annual Conference, Composites Institute, The Society of Plastics Industry, Inc., Feb. 2–6, 1987, Session 18-C, pp. 1–11—"Processing of Polyurethane-Polyester Interpenetrating Polymer Network".

W. N. Reed and M. Kallaur, Proceedings, 42nd Annual Conference, Composites Institute, The Society of the Plastics Industry, Inc., Feb. 2–6, 1987, Session 8-B, pp. 1–4; "Interpenetrating Polymer Networks—A Versatile Tool for Solving Tough Problems".

H. R. Edwards, Proceedings, 39th Annual Conference, Reinforced Plastics/Composites Institute, The Society of the Plastics Industry, Inc., Jan. 16–19, 1984, Session 8-C, pp. 1–8; "Handling and Physical Properties of Hybrid Polyesters".

M. Mazzola, P. Masi, L. Nicholais, and M. Narkis, J. Cellular Plastics, Sept./Oct. 1982, pp. 321–324; "Fiberglass Reinforced Polyester Foams".

H. R. Edwards, Proceedings, ANTEC '86, pp. 1326–1330; "The Use of Isophthalic Unsaturated Polyester Urethane Hybrids in Conventional Molding Techniques".

Y. Huang, T. J. Hsu and L. J. Lee, Polymer, 1985, vol. 26, Aug., pp. 1247–1252, "Effect of Compound Composition on Fast Reactions of Polyurethane and Unsaturated Polyester in the Bulk State".

REINFORCED FOAM COMPOSITES COMPRISING HYDROXY-CONTAINING VINYL ESTER RESIN

BACKGROUND OF THE INVENTION

1. Field of the Invention and Prior Art

The invention relates to high-density foams and foam composites and is particularly directed to rigid polyurethane/polyvinyl ester foamed polymer hybrids comprising a particular type of hydroxyvinyl ester, the foam ingredients all together providing the necessary components for a hybrid polyurethanepolyvinyl ester matrix, having a density of at least 20 pounds per cubic foot, and composites comprising the same.

Rigid polyurethane and isocyanurate-modified polyurethane foams have been variously described in literature, both in patent and scientific papers by various authors. Almost all of these isocyanate-based foams containing various fillers were primarily produced by two methods, and almost all of them were intended for insulation purposes. They have been produced either continuously for low-density (2-3 pcf) thermal insulation (board stock) or by molding of panels. Various equipment has also been designed for that purpose.

However, very little has been disclosed in literature or patents regarding high-density, rigid polyurethane or modified polyurethane foams designed for structural purposes and having strength properties comparable to wood, although a number of molding methods including reinforced reaction molding (RRIM) have been developed for the production of molded parts, especially for the automotive, furniture and appliance industries.

An object of this invention is the intermittent or continuous production of high-density foams comprising a special hybrid of polyurethane/polyvinyl ester foam comprising a particular type of hydroxyvinyl ester, especially in combination with various fillers and reinforcing fibers, which are uniquely designed to provide a combination of mechanical strength properties and environmental (outdoor weathering) properties which make them eminently suitable for applications where wood is normally used for strength and durability. Wood substitutes made of reinforced high-density fiberglass-reinforced polyurethane foams have heretofore been prepared, for example, a product known as Centrite, and a number of like products described in *Industrial And Engineering Chemistry, Product Research And Development*, Vol. 23, No. 1, (1984) p.p. 81-85, by Kiyotake Morimoto and Toshio Suzuki, and in *Proceedings, SPI International Urethane Conference*, Strasbourg, France, June 9-13, 1980, by F. Okagawa et al., pp. 453-467. Reference is also made to our U.S. Pat. No. 4,680,214, issued July 14, 1987, which uses a different approach.

It is an object, therefore, to provide rigid foams and reinforced foam composites by a new approach, as above-identified, and thereby to provide such foams having advantageous characteristics such as improved impact strength and flexural modulus, especially of the final reinforced composites, and which therefore have not only the advantage of further superior properties, such as much better dimensional stability and improved weathering resistance as well as resistance to biological attack, but which can also be produced either by molding or continuously and, if desired, in dimensions beyond any possibilities as far as wood boards are concerned (in addition to absence of the many imperfections present in wood because of knots and splits) and to provide foams, the uniqueness of which lies also in the fact that, while resembling wood in many respects because of many physico-mechanical properties similar to wood, they can be used in applications where wood would not be practical or acceptable due to deterioration of the latter on aging.

Reinforced composite materials comprise a matrix material, such as a resin, and a reinforcing material such as fibers. Composites, therefore, are expected to be new structural materials for the automotive, building, ship, aircraft, and space industries. The resins for the matrix include both thermoplastic and thermosetting resins. Major thermoplastic resins include polypropylene and polyethylene terephthalate, and major thermosetting resins include polyurethanes, polyisocyanurates, polyureas, cyclopentadiene polymers, unsaturated polyester-urethane hybrid resins, and now polyurethane hydroxyvinyl ester hybrid resins.

Some of the most widely-used thermosetting composites for automative use comprise SMC (sheet molding compounds), which are used for hoods, front grill panels, and trunk lids for cars. Other widely-used thermosetting composites for automobiles are polyurethane and polyurea-based. These are used in the area of fascias, fenders, door panels and some indoor structural parts. Such composites comprise a resin and glass fibers. Other types of composites, e.g., plastic foam-based composites, are contemplated for use as wood substitutes comprising polyurethane foam and glass fibers. (International Progress in Urethanes, Vol. 2, page 85 (1980), Edited by K. Ashida & K. C. Frisch and published by Technomic Publishing Co. Inc.).

Polyurethane foams are recognized to be excellent materials, that is, readily processed, having a high degree of chemical resistance, and being susceptible to a broad-variety of molecular designs varying from flexible foams to rigid foams and from low density to high density foams.

These advantages are exploited in the production of urethane foam composites by means of combinations of rigid urethane foam and glass fibers, and the products are applied as wood substitutes and light-weight structural parts in industry. Such products are available in the USA (Centrite TM, Center Corp.) and in Japan (Neo-Lumber, Sekisui Chem., and Airlite FRU, Nisshinbo Ind.).

However, existing composites have numerous disadvantages, resulting in limited use. The disadvantages include: (a) excessive coefficient of thermal expansion, (b) poor dimensional stability, (c) poor temperature stability, and (d) viscosity problems for making mat molding or fiber-reinforced composites due to relatively high viscosity of the systems.

In an effort to solve these disadvantages, a relatively new concept, that is, the concept of polymer hybridizing, was applied according to the present invention. Polymer hybridizing involves multicomponent polymer systems, comprising at least two different polymer networks. In the present case, the different systems involved are polyurethane and vinyl ester comprising a particular type of hydroxyvinyl ester, designated by Formula I in the following, which "interpenetrates" into both the polyurethane and the polyvinyl system.

BRIEF DESCRIPTION OF THE DRAWINGS

Reference is now made to the drawings for a better understanding of the invention, wherein.

OBJECTS OF THE INVENTION

Figure 1:
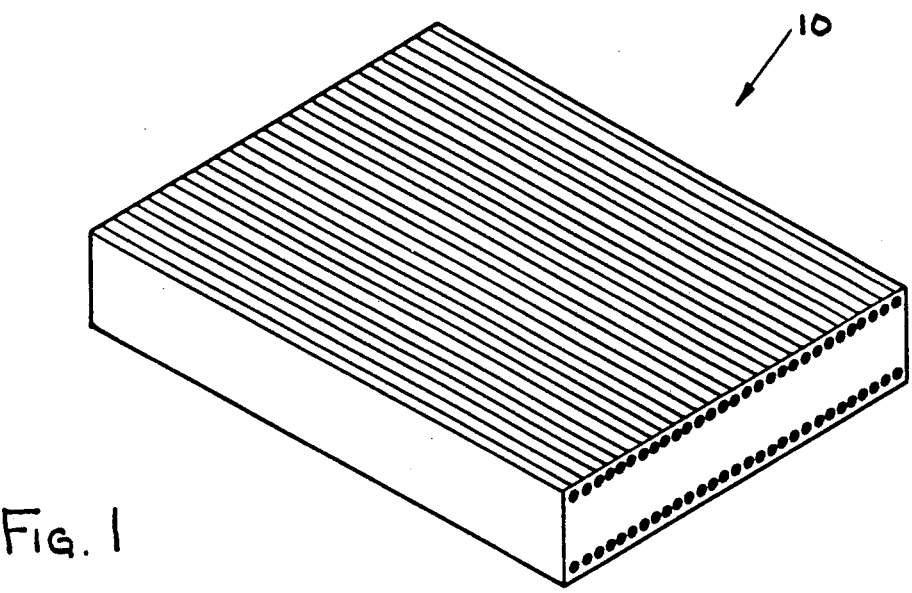
FIG. 1 is an isometric view of a reinforced foam composite in accord with the present invention.

It is an object of the invention to provide a novel polyurethane foam of the rigid type prepared from novel components including not only polyol and polyisocyanate 'ut also a unique hydroxy-containing vinyl ester and vinyl monomer, optionally together with an additional polar vinyl monomer or co-monomer, all together providing the necessary components for a hybrid polyurethane-vinyl ester matrix, which mixture of components before foaming is capable of having suspended therein fillers and reinforcing fibers to produce a foam or reinforced foam composite having a density between about 20 and 100 pounds per cubic foot. Another object is to provide such a reinforced foam and reinforced foam composite which can be made into boards and the like and advantageously has continuous fiberglass strands, meshes, screen, or yarn disposed in or adjacent to the surface skin of the foam, which strands or yarn are preferably parallel and close together and preferably flattened out in the foam-forming process so that the surfaces have a continuous fiberglass implant longitudinally and substantially so transversely. A further object is to provide structural reinforced foam composites having a central foam core and at least one and preferably additional reinforcing layers on at least one and preferably on both sides thereof. Still further objects will be apparent to one skilled in the art and still additional objects will become apparent hereinafter, especially from the "SUMMARY OF THE INVENTION" which follows.

THE INVENTION IN GENERAL

A vinyl ester system comprising hydroxyvinyl ester, vinyl monomer, free radical initiator, promoter, and a polyurethane foam system comprising polyisocyanate, polyether or other polyol, blowing agent, catalyst and surfactant, and optionally but preferably a polar vinyl monomer or "comonomer", are reacted, preferably in a single step, to produce novel hybrid foams.

In these foams, it is found that:

a) Increased foam density increases physical strength of the resulting foam.

b) Increased foam core density of a composite also increases physical strength of a resulting composite.

c) Reinforcement by means of continuous fibers (continuous strands or yarn roving and continuous strand or yarn mat, as well as metallic screens and yarns) produces an outstanding increase in physical strength of the resulting composite, i.e., impact strength, flexural stress and flexural modulus.

d) A comparison between natural wood (pine wood and treated pine wood) and a composite of the invention shows that the composite has numerous advantages, including higher load-bearing properties than natural wood.

SUMMARY OF THE INVENTION

The invention, then, comprises the following aspects, inter alia, singly or in combination:

A high-density foam formed by foaming, with an amount of foaming agent such that the density is at least twenty pounds per cubic foot, a foam composition comprising:

(A) a foam-forming organic polyisocyanate component having a functionality greater than two;

(B) a polyol component having a functionality of at least two and preferably higher and an equivalent weight preferentially between about 300 and 1,000;

(C) a urethane catalyst;

(D) a surfactant suitable for use in urethane foams;

(E) water as blowing agent;

(F) a hydroxyvinyl ester having the formula $$CH_2=C(CH_2)_{\overline{m}}COO-$$
$$\phantom{CH_2=}|$$
$$\phantom{CH_2=}R$$

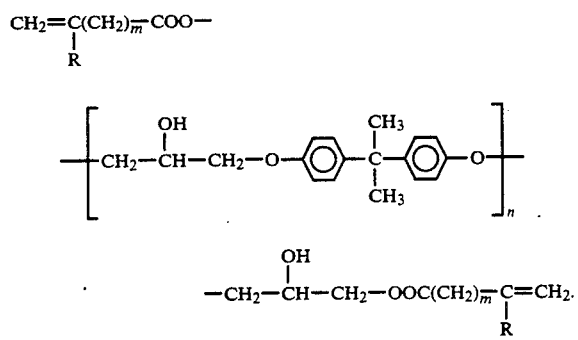

$$-CH_2-\underset{|}{\overset{OH}{C}H}-CH_2-OOC(CH_2)_{\overline{m}}\underset{|}{\overset{}{C}}=CH_2.$$
$$\phantom{-CH_2-CH-CH_2-OOC(CH_2)_{\overline{m}}}R$$

wherein n is 1 or 2, m is 0 or 1 through 4, R=H or $C_{1-4}$alkyl, dissolved in a liquid vinyl monomer in an amount up to about 50% by weight of the hydroxyvinyl ester, the vinyl ester solution being present in an amount between about 0.3 to 1 and about 0.8 to 1 by weight with reference to components (A) and (B) combined;

(G) a free-radical initiator catalyst, the isocyanate component (A), and the combined components (B), (C), and (E), being in proportions which provide an isocyanate index between about 50 and about 300, said composition having a consistency such that fillers and reinforcing fibers can be suspended therein in an amount of about 10 to about 50 percent based on the total weight of the composition; such a foam comprising also a polar vinyl co-monomer (H) in an amount between about 5 and 15 percent by weight, preferably about 10% by weight, of the hydroxyvinyl ester reactant (F); such a foam comprising also up to about 5% by weight of polyol (B) of a cross-linking agent (I); such a foam wherein the ratio by weight of vinyl polymer components (F) and any polar vinyl co-monomer (H) present to polyurethane polymer components (A) and (B) is between about 0.33 to 1 and 0.9 to 1; such a foam having a density between about 20 and 66 pounds per cubic foot without added fillers and reinforcing fibers; such a foam having a density between about 22 and 100 pounds per cubic foot with added fillers and reinforcing fibers; such a foam wherein the hydroxyvinyl ester (F) is in solution in styrene up to about 50% by weight of the hydroxyvinyl ester and wherein the polar vinyl comonomer (H) and the styrene copolymerize; such a foam wherein the polyol component (B) has an equivalent weight of about 500; such a foam wherein the isocyanate index ranges from about 75 to 120; such a foam wherein the vinyl ester (F) solution is present in amount of about 0.5-0.6 to 1 by weight with reference to components (A) and (B) combined; such a foam wherein the ratio by weight of hydroxyvinyl ester (F) solution components and any polar vinyl co-monomer (H) present to polyurethane polymer components (A) and (B) is about 0.6 to 1; such a foam wherein, besides free-radical initiator catalyst (G), a cocatalyst is also present; such a foam wherein the cocatalyst is a cobalt salt; such a foam wherein dimethylaniline (DMA) is also present and wherein the weight ratio of catalyst, cobalt salt, and DMA is 10/0.5/0.5 to 10/2/2; such a foam wherein the ratio is about 10/1/1; such a foam wherein in the Formula for (F) n=1, R=methyl, and m=0; such a foam wherein the polyol component (B) comprises a plurality of polyols; such a foam wherein the polyols comprise a blend of a diol and an amine-based polyol; such a foam wherein the equivalent weight ratio of the diol to the polyol is about 1/1 to 3/1; such a foam wherein the ratio is about 2/1; such a foam wherein the polyol component (B) is a blend of a diol having an equivalent weight of about 500 and an amine-based polyol having an equivalent weight of about 100 and the organic polyisocyanate component (A) is a polymeric isocyanate (PMDI) such as is PAPI (Dow Chemical Co.); such a foam wherein the polar vinyl monomer is selected from the group consisting of:

methyl methacrylate, vinyl acetate, ethyl acrylate, butyl acrylate, methyl acrylate, 2-ethyl hexylacrylate, allyl alcohol, acrylamide, 2-hydroxyethyl methacrylate, ethyl methacrylate, isobutyl methacrylate, n-butyl methacrylate, and 2-ethyl hexylmethacrylate; such a foam wherein the composition contains, based on the total weight of the composition, about 10 to about 40 percent each of one or more mineral fillers and not more than about 50 percent of mineral fillers and reinforcing glass fibers combined; such a foam in which the mineral filler comprises wollastonite and trishydrated alumina; such a foam wherein the composition contains, based on the total weight of the composition, about 10 to about 50 percent of reinforcing glass fibers; such a foam in which the foam comprises continuous fiberglass strands, yarn, or mats disposed therein; such a foam wherein the foam has a skin on each of longitudinally-disposed, parallel surfaces and contains longitudinally-disposed, parallel fiberglass strands or yarn in or adjacent said skin surfaces and spaced closely together across the width thereof; such a foam wherein the fiberglass strands or yarn are flattened in side-by-side relation to give surface skins in which the fiberglass continuous strands or yarn are in close proximity or near contact; such a foam wherein the density of the foam is greater than about 40 pounds per cubic foot; such a reinforced structural foam composite comprising a central core of unfilled foam, an outer skin of continuous fiberglass roving, an inner layer of fiberglass mat located beneath said skin of continuous fiberglass roving, and a layer of foam core impregnated with chopped glass fiber or other filler material beneath said continuous strand mat layer; such a composite wherein the structure of the composite is identical on both the top and bottom thereof; such a composite wherein the continuous fiberglass roving is flattened in side-by-side relation to give a surface skin in which the fiberglass continuous strands or yarn are in close proximity or in near contact; such a composite wherein the density of the foam is between about 22 and 100 pounds per cubic foot; and such a composite wherein the foam core has a density between about 20 and 66 pounds per cubic foot.

GENERAL CONSIDERATIONS

A significant feature of the foam compositions of the invention is the density range, which can be varied widely depending upon the foam system, the type and amount of fillers and reinforcing fibers and the respective ratios of 1) resin components and 2) fillers and reinforcing fibers. Preferred densities range from about 20-66 pounds per cubic foot for the unfilled foams and about 22 to 100 pounds per cubic foot for the reinforced foams, although both lower and higher foam densities of course can be achieved.

The major ingredients of the polyurethane component of the present foams are polyols and polyisocyanates along with catalysts, surfactants and blowing agent (water, which provides $CO_2$, optionally plus fluorocarbons, methylene chloride, or other suitable blowing agent). However, it is the unique combination of foam ingredients of this invention which makes them surprisingly adaptable to the production of high-density foams providing compatibility of the components, good flow and processability, as well as unique and advantageous properties of resulting composites.

Raw Materials—Discussion

I. System For Hydroxyvinyl Ester a) Vinyl Ester

Hydroxyvinyl esters for use in the present invention are described and discussed under the heading "REACTION SEQUENCE FOR PREPARATION OF VINYL ESTERS".

b) Vinyl Monomer

The vinyl monomer is a non-polar non-hydroxy vinyl monomer, preferably aromatic in nature, i.e., a vinyl monomer which is preferably a vinyl aromatic, in which the hydroxyvinyl ester of Formula I is soluble and which is compatible with the polyurethane components and with the hydroxyvinyl ester itself. Styrene is preferred, but additional such monomers comprise vinyltoluene, alpha-methylstyrene, divinylbenzene, dichlorostyrene, butadiene, isoprene, mixtures thereof which provide the required characteristics as previously set forth, and the like.

c) Polar Vinyl Monomer (or Co-monomer)

Representative polar vinyl monomers which may be used in accord with the present invention are set forth in Table B. They are advantageously non-hydroxy in nature.

The Polar Vinyl Monomer may be, inter alia, selected from the following:

methyl methacrylate, vinyl acetate, ethyl acrylate, butyl acrylate, methyl acrylate, 2-ethyl hexylacrylate, allyl alcohol, acrylamide, 2-hydroxyethyl methacrylate, ethyl methacrylate, isobutyl methacrylate, n-butyl methacrylate, and 2-ethyl hexylmethacrylate, although other suitable polymerizable non-hydroxy polar vinyl monomers may also be employed if desired. The incorporation of such polar monomers into foams and composites of the present invention increases adhesion of the foam to fibers and increases penetration into the fibers, thereby resulting in improved impact strength and flexural modulus of resulting composites. The presence of the polar vinyl monomer appears to especially increase adhesion of the foam to fibers contained therein.

When polar vinyl co-monomers are included in chopped fiber glass- or other filler-reinforced rigid foams, it is found they improve physical properties significantly, especially the higher boiling point vinyl monomers, e.g., 2-ethylhexylacrylate and 2-hydroxyethylmethacrylate.

The amount of polar vinyl monomer can obviously affect the physical properties of the foam. It is found that approximately ten (10) percent of the polar vinyl monomer by weight of hydroxyvinyl ester results in improved mechanical performance, with broader ranges being between about five (5) and fifteen (15) percent by weight of the hydroxyvinyl ester.

Ratio of Polar Monomer to Hydroxyvinyl Ester

Although the ratio of polar vinyl co-monomer, when present, to hydroxyvinyl ester is not critical, the optimum molar ratio is approximately 1 to 10, with broader ranges being between about 1 to 15 and 1 to 5. Accordingly, about one part of polar vinyl monomer per every ten parts of hydroxyvinyl ester is approximately normal, with broader ranges of 1 part in 5 to 1 part in 15 being acceptable and even broader ranges being utilizable if more or less polarity in the vinyl block portion of the polyurethane-vinyl ester polymeric network is desired.

d) Free Radical Initiator

A free radical initiator acts as catalyst for the free radical polymerization of vinyl, e.g., styrene, monomer and hydroxyvinyl ester.

Such free radical initiator is selected from organic peroxides such as benzoyl peroxide, 2,5-dimethyl 2,4-bis(2-ethylhexanoylperoxy)hexane (Lupersol 256-Pennwalt), methylethylketone peroxide (sold in plasticizer by Reichhold Chemical Co.), cumene hydroperoxide, t-benzoyl peroctoate, acetyl peroxide, di-t-butyl peroxide, and the like.

e) Promoter or Cocatalyst

A promoter or cocatalyst is a compound which promotes the formation of a free radical by decomposing the catalyst by means of a redox reaction.

Representative promoters include the following:

cobalt salts, especially cobalt naphthenate, vanadium salts, vanadium complexes, tertiary amines, e.g., dimethylaniline (DMA), quaternary ammonium salts, and mercaptans. Such compounds are well known in the unsaturated polyester chemistry art.

Tertiary amines such as DMA are advantageously employed in combination with a cobalt salt as a co-promoter, and such is also true in the present case wherein ratio by weight of peroxide free-radical catalyst to cobalt salt co-catalyst to DMA is usually about 10/0.5/0.5 to 10/2/2, preferably 10/1/1.

II. Polyurethane System a) Polyol

The major polyol components of the urethane foams are poly(oxypropylene) and poly(oxypropylene) poly(oxyethylene) adducts of polyfunctional diols and polyols having at least two reactive hydroxyl groups such as the diol Pluracol 1010 (BASF) and the triol Poly G-70-600 (Olin) or the like, such as NIAX L4-475 or 700 (Union Carbide).

By selecting diols or polyols, and preferably combinations thereof, having the following requirements, namely, an equivalent weight between about 300 and about 1,000, and preferably about 500, a functionality no greater than about 3, a balance of useful properties, from the point of view of mechanical strength properties as well as for purposes of readily processable viscosities for continuous foam machine operation, can be obtained.

Suitable polyols for inclusion in combinations are poly(oxyalkylene) adducts of glycerol, trimethylolpropane, and like aliphatic polyols having not more than 6 carbon atoms. These adducts consist generally of ethylene or propylene oxide adducts, although other oxyalkylating agents can be used, either alone or in combination.

Suitable such other polyols for inclusion in combinations are those polyols which are known to form rigid foams, to wit, those having an equivalent weight of about 70 to about 110, and a functionality of not more than about 3, as well as aromatic polyester polyols (diols or polyols) which have an equivalent weight of about 100 to about 400 and a functionality of 2 to 3, some of which are derived from terephthalate esters or by-products of terephthalates by transesterification with various glycols.

Although combinations of polyether polyols with various terephthalate-based polyester polyols have been disclosed in literature, again mainly for low-density urethane or isocyanurate foams, the difficulties regarding compatibility of these components, particularly in conjunction with fluorocarbons, have been emphasized. While a number of compatibilizing agents have been used on this account, in the present invention there is no need for any special compatibilizing agents since the foams of this invention are not low-density products and, hence, do not require any substantial amount of fluorocarbon or none at all, and aromatic polyester polyols are compatible with the polyether polyols used in the novel compositions of the invention at many proportion levels which may be employed.

Thus, an important aspect of this invention is to permit use of combinations of various polyfunctional polyols with aromatic polyester polyols, such as phthalate, isophthalate, and terephthalate polyester diols, and polyols, such as poly(oxyalkylene) ethers based on aliphatic polyols having not more than 3 carbon atoms, for example, glycerol and trimethylol propane or similar polyols, which have an equivalent weight of about 300 to about 700 and a functionality not greater than about 3, as well as poly(oxyalkylene) adducts of aminopolyols, such as triethanolamine, diethanolamine, or ethanolamine. Blends having excessive amounts of low-molecular weight and/or amine-based polyols tend to result in products exhibiting a brittleness and mediocre nail-holding power, whereas it has been found that suitable combinations bring about a combination of strength as well as nail-holding power and good flow properties (although this may not necessarily restrict the number of polyol components).

The proportions of the several polyols, when combinations are employed, advantageously are in any event maintained within a relatively narrow range. Thus, it is desirable to use a mixture of a diol such as Pluracol 1010, and an amine-based polyol such as Poly G-70-600 the equivalent weight ratios thereof preferably being 1/1 to 3/1 and especially about 2/1.

As already stated, polyether polyols and polyester polyols can be used. Polyether polyols include polyoxypropylene, polyoxypropylene polyoxyethylene, and polyoxyethylene ether polyols. The polyols can be classified into neutral polyols and amine-based polyols which include not only aliphatic polyether polyols, but also aromatic polyether polyols.

Aromatic polyesters derived from transesterification of polytetraethylene terephthalate or dimethyl terephthalate can also be used.

The polyols are preferably used as blends, inasmuch as blends of polyols can be adjusted to meet requirements for physical properties. A wide variety of blends is obviously possible.

b) Polyisocyanate

Suitable polyisocyanates are polymeric isocyanates (PMDI) such as poly(phenylene) poly(methylene) isocyanate (PAPI), also named poly(isocyanatophenylmethylene) phenylisocyanate, produced by phosgenation of reaction products of aniline with formaldehyde in acid media, or like polyisocyanates. The poly(phenylene) poly(methylene) isocyanates are disclosed in U. S. Pat. No. 3,916,060, where they are used in making low-density (2.0 to 2.8 lbs./cu.ft.) semi-rigid foams. The functionality of these polyisocyanates may vary between 2.2 and 3.0.

Polyisocyanates with higher functionality can also be used, although "crude" varieties of MDI are most suitable and present a lower cost picture than other types of aromatic polyisocyanates. These materials also have very low vapor pressure and, hence, are preferable to use for environmental and health reasons.

The polyisocyanate used for production of the urethane foam system is in general selected from the following:

Aromatic polyisocyanates, such as tolylene diisocyanate (2,4-isomer, 2,6-isomer, and their mixtures), 4,4'-diphenylmethane diisocyanate (MDI), polymeric MDI (polymeric isocyanate), MDI prepolymers, and carbodiimide modified MDI, all of which are commercially available. Other aromatic polyisocyanates and their derivatives can also be used according to the present invention.

Isocyanate Index

The ratio of polyisocyanate to polyol, i.e., isocyanate index (NCO/OH×100), can vary considerably. Generally, the isocyanate index for the urethane foams of the invention can vary between about 50 and about 300. In the context of this invention, it is desirable not to have too high an isocyanate index, for example, not more than about 200, in order to avoid brittleness. Preferentially, the isocyanate index is about 75 to 120.

As already stated, it is a feature of this invention that a combination of polyols can be advantageously employed to reduce the tendency to brittleness.

c. Crosslinking Agent

A crosslinker is optional, but may as usual in the art be employed to prevent foam collapse and add structural rigidity. When employed, it is preferably used in amount up to about 5% by weight of the polyol and it is usually a trifunctional low-molecular weight hydroxy or hydroxy plus amine-containing compound such as diethanolamine (DEOA), Quadrol ™, any other trifunctional compound such as glycerine, triethanolamine, trimethylolpropane, or the like.

Therefore, as an optional but preferable reactant which, if employed, is usually included in Component A, a cross-linking agent of usual type such as diethanolamine (DEOA) or the like may be employed. Such a cross-linking agent helps to prevent foam collapse and rigidifies the foam structure and provides added structural strength by virtue of the additional crosslinking between polymer chains provided thereby in the polyurethane segment of the hybrid polymeric network of the invention. Such cross-linking agent is generally employed in an amount up to about 5% by weight of polyol utilized and, as usual, involves relatively short chain structure, preferably with an amine segment, such as DEOA or the like. Other cross-linkers may be employed, as set forth in the foregoing.

d) Catalyst

Catalysts—Polyurethane

The catalyst for the foams is a urethane catalyst or combinations thereof.

Suitable urethane catalysts are triethylenediamine (1,4-diazabicyclo-[2,2,2]octane, "Dabco", Air Products), Dabco 8020 (20% Dabco in 80% dimethylethanolamine, or Dabco 33LV (33% Dabco in 66% diethylene or dipropylene glycol), Niax A-1 (70% bis-(2-dimethylaminoethyl)ether solution in dipropylene glycol (Union Carbide), Polycat (1,3,5-tris(dimethylaminopropyl)hexahydrotriazine, Air Products) and other tertiary amines or tertiary amine combinations.

In most cases, small amounts of organometal catalysts such as dibutyltin dilaurate (Dabco T-12), dibutyltin diacetate, stannous octanoate, and zinc octanoate can be used as urethane catalysts. Combinations of such metal catalysts with tertiary amines frequently produce synergistic catalytic effects in the formation of these foams.

The catalyst employed according to the present invention is relatively standard for usual urethane foam preparations. Suitable catalysts include, for example, tertiary amines such as dimethylaminoethyl ether, triethylene diamine, metal catalysts such as dibutyltin dilaurate, stannous octoate, and the like.

e) Surfactant

In order to regulate the size and shape of the foam cells, usual compatible surfactants can be employed as cell regulators. These include non-ionic surfactants, and both silicone and non-silicone-containing surfactants. Preferred silicone-containing surfactants are dimethylsilicone-poly(oxypropylene) (oxyethylene) copolymers. Typical surfactants which are used advantageously in this invention are DC-193 (Dow Corning), L-5340 (Union Carbide), or similar copolymers. Other types of suitable non-ionic surfactants are block copolymers of poly(oxypropylene) and poly(oxyethylene), e.g., Pluronic polyols (BASF Wyandotte).

Any one or more of a number of surfactants previously used in the manufacture of urethane foams can also be used in accord with the present invention. Representative urethane foam surfactants include block copolymers of polydimethylsiloxane, poly(oxyalkylene)polyethers, and the like.

f) Blowing Agent

Various blowing agents can be used to achieve a foam density of at least 20 pounds per cubic foot. Water is generally essential for such density. In general, the density of the foams is inversely proportional to the amount of blowing agent used. Typical blowing agents which can be used in this invention are carbon dioxide (formed as a result of the reaction of isocyanate groups with water), plus fluorocarbons such as trichlorofluoromethane (F-11) and trichlorotrifluoroethane (F-113), and methylene chloride. Combinations of blowing agents may also be used, such as $CO_2$ and one or more fluorocarbons or a fluorocarbon and methylene chloride. The water present in the reaction components is generally inadequate; more is generally required as indicated in the Examples.

The use of additional methylene chloride, F-11, and like low-boiling solvents is sometimes beneficial for the formation of smooth surfaces of the resulting foams.

The blowing agent employed in the present invention thus may be water and/or other reactive blowing agents such as nitroethane, nitrourea, or acetyl acetone, nonreactive blowing agents such as chlorofluorocarbons (CFC's) such as trichloromonofluoromethane (CFC-11), hydrochlorofluorocarbons (HCFC) such as HCFC-123, HCFC-141b, and the like. When densities of greater than twenty (20) lb/cu/ft are required, water is essential, although other blowing agents may be used in conjunction therewith.

III. Hybrid Resin Foam Preparation

The weight ratio of the hydroxyvinyl ester system to the polyurethane foam system, calculated using the components employed, can be varied widely within the range of about 0.3 to 1 to about 0.8 to 1, preferably about 0.5–0.6 to 1. When polar vinyl monomer is included, the range is about 0.3 to 1 to 0.9 to 1, preferably about 0.6 to 1.

Thinning Agents

Propylene carbonate (PRC), when used as a thinning agent for the system, is found to decrease the system viscosity remarkably. PRC is also found to be effective in increasing physical properties in certain systems, especially high viscosity systems. The use of PRC frequently allows production of composites having greater quantities of reinforcement, resulting in higher physical strengths.

IV. Reinforcement

Continuous fibers and chopped fibers can be used for foam reinforcement, as well as usual particulate fillers. Fibers include inorganic fibers such as glass fibers, carbon fibers, graphite fibers, and polymeric fibers such as aromatic polyamide fibers (Kevlar TM, etc.), polyethylene fibers, polyethylene terephthalate fibers, and the like.

Reinforcing Fillers and Fibers

Another characteristic feature of the invention is thus the use of filler materials such as wollastonite, mica, carbon fibers, Aramid TM fibers, metal fibers, or other types of organic or inorganic fibrous materials in various forms. Also, another characteristic feature is the use of reinforcing materials such as glass fibers, strands, rovings, yarn, or bundles of rovings, especially in the form of continuous glass strands, milled glass fibers, and chopped glass fibers, and combinations thereof. Furthermore, meshes and screens made of glass fiber, metal, or plastic, can also be used. Advantageously, the amount of about 10 to about 40 percent fillers is used and about 10 to 30 percent glass fiber is used, of which the total is from about 10 percent to about 50 percent by weight of the total composition.

A typical combination of glass fibers in these foam composites can be obtained by the continuous feeding of continuous strands or yarn along the upper and lower surfaces of a molding machine as the foam-forming components are fed thereto. The machine is set to produce billets (boards or beams) suitable for use as construction material which, while capable of being substituted for wood, nonetheless have properties which make them useful in situations where wood is not suitable.

The strands or yarn are made up of bundles of monofilaments aggregated together into larger bundles which may be as much as three- to four-sixteenths of an inch in diameter, more or less, and are standard commodities of commerce. The single filaments in the strands are linear whereas those in the yarn are crimped. Thus, the strands do not stretch whereas the yarn does. For most purposes the continuous strands are preferred because better tensile properties, such as flexural strength and flexural modulus, are obtained as a rule.

The continuous strands or yarn are placed close together, almost side by side, but with sufficient space between them so that, when they are flattened out in the processing, or are flattened out when introduced into the molding machine, they are essentially juxtaposed so that the skins which form on the top and bottom of the finished billet contain longitudinally-disposed continuous glass filaments which are transversely in close proximity or in near contact.

Such "flattening" of fiberglass yarn or strands in side-by-side relation is in fact old in the art. By way of explanation, it should be pointed out that, first of all, continuous glass strands are generally "bundled" together by either of two different methods, the products of which are called either "assembled strands" or "direct strands" (or "direct rovings"). The "assembled" strands are more ovate than circular, but are loosely described by their diameter. The "direct" strands are generally of a more flattened nature, where the width of the strand is the predominant measurement. The producers of "direct strands" refer to them as "zero catenary" strands, which means that they are free of loops or uneven lengths, this being claimed by their producers to be an advantage. Representative examples are P965, 670-A9–113QP, or 366-AD-113 by Owens-Corning and R099 by CertainTeed. The last three numbers in each of the product identification codes are variable to designate the pounds of glass used in making up the strand. The pounds of glass used dictate the cost. For example, P965AA113 or 670-A9–113QP indicate that a pound of glass yields 113 yards of strands per bundle, whereas R099250 indicates that a pound of glass yields 250 yards of strands per bundle. The R099 CertainTeed product is referred to as a "direct" or zero catenary roving, whereas the Owens-Corning product is referred to as an "assembled" roving. For purposes of the present invention, either type of continuous glass fiber may be further "flattened" according to the skill of the art by one or more commonly-available procedures employing commonly-available equipment. For example, the so-called "Pultrusion" procedure may be employed, whereby glass strands are flattened in side-by-side relationship by a pair of rollers, usually as the glass strands leave a wet-out tank wherein they may be wetted out with an appropriate resin. Another commonly-employed procedure has its origin in filament winding, and involves procedure wherein the fiberglass strands are flattened by running over a fixed rod. Either of these procedures, or others known in the art, may be employed to flatten the fiberglass strands in side-by-side relationship whereby the continuous filaments, strands, yarn, or rovings come into close proximity or near contact with each other.

In lieu of fiber glass strands or yarn, there may sometimes be substituted fiberglass mats or matrices, either woven or felted but, in any case, loosely woven or felted. Prior to the introduction of the foaming components, there may be incorporated therein fillers as described above, inclusive of non-continuous glass fibers, such as milled or chopped glass fibers. Advantageously, in a preferred composite of the invention, such mats or matrices underlie an outer fiberglass roving and are underlain by an area of foam comprising chopped fiberglass or other particulate filler, all surrounding a core of unfilled foam having a density of between about 20 and 66 lbs/cu ft, the entire or complete composite having a density between about 22 and 100 lbs/cu ft, all as shown in and described for the FIGS. of the drawings herewith.

The glass fibers (in whatever form they are used) are preferentially sized with glass fiber-sizings, such as silane, titanate, or like coupling agents, to promote adhesion between the glass and the resin matrix.

The fillers can be similarly treated, for example, wollastonite surface-modified with silane is available commercially as Wollastokup (NYCO).

It is another characteristic feature of this invention that certain other types of fillers and additives are used to effect certain combination properties of these unique foam composites. For example, the addition of alumina trishydrate ($Al_2O_3 \cdot 3H_2O$), and wollastonite, with or without other inorganic fillers such as fly ash, gypsum, sodium silicates, calcium carbonate, zinc borate, ammonium phosphate, and similar additives provides a low degree of combustibility and low smoke evolution.

Combinations of various fillers and reinforcing fibers can be used, such as wollastonite, alumina trishydrate and glass fibers to achieve especially good results.

Surface Treatment of Reinforcing Fibers

According to the skill of the art, the strength of any composite reinforced by fillers or fibers is significantly affected by the bonding force between the matrix resin and the reinforcement employed. Accordingly, the surface of the reinforcing fillers or fibers is usually treated with an agent which increases adhesion to the fibers, for example, with dimethyl silane, a titanate, a silicate, or the like. Such procedure may also be employed according to the present invention, but the inclusion of a polar vinyl monomer among the vinyl components of the foam composition appears by itself to enhance adhesion of the foam to fibers and/or powder fillers employed for reinforcement of the foam composites of the invention.

Flame Retardants

Organohalogen or organophosphorus-type flame-retardants, such as tris(dichloropropyl)phosphate, tris(chloroethyl)phosphate, dibromoneopentyl glycol, glycol esters or ethers derived from tetrabromo or tetrachlorophthalic anhydride, as well as other reactive or additive types of flame-retardants containing combinations of P, Cl, Br, and N, can be added to impart flame-resistant properties to the foams and foam composites.

V. Reinforced Composite Structure

A preferred composite structural embodiment according to the present invention comprises at least two major layers, i.e., continuous fiberglass roving-reinforced skin and unreinforced foam core in which the skin significantly increases the strength of the flexural modulus and flexural stress, which is important for structural applications, and preferably includes an intermediate underlying layer of matted fiberglass, preferably continuous strand mat, and a second underlying layer of chopped-fiberglass or other particulate filler reinforced foam.

REACTION SEQUENCE FOR PREPARATION OF VINYL ESTERS

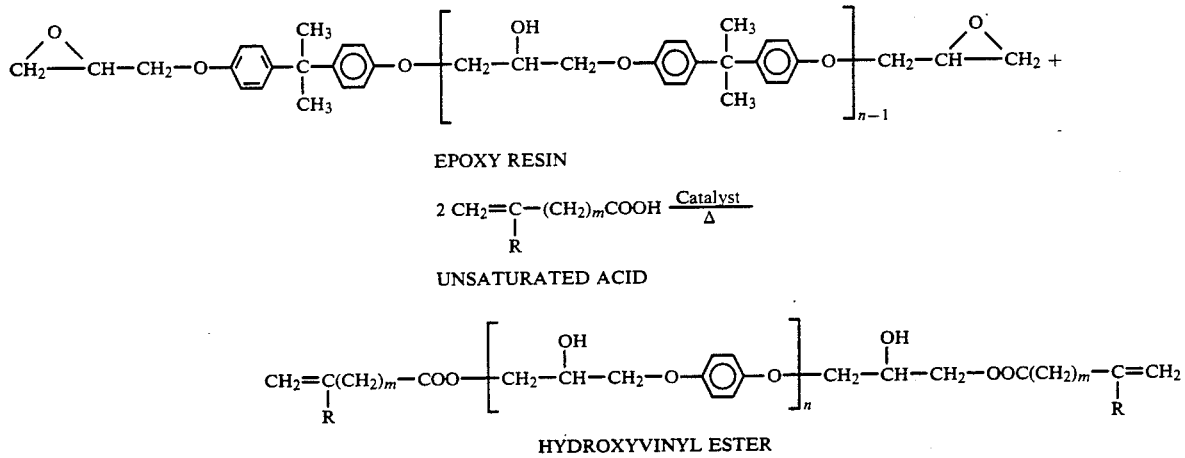

EPOXY RESIN

UNSATURATED ACID

HYDROXYVINYL ESTER n = 1 or 2   m = 0, 1-4
R = H or $C_{1-4}$alkyl

Catalyst: tert. amine, phosphine, alkali, or onium salt
Ref: R. E. Young, Chapter entitled "Vinyl Ester Resins", pp. 316 et seq. in Bruins, P. F., Editor, "Unsaturated Polyester Technology", Published by Gordon Breach, Inc., N.Y., N.Y. (1976), and Dow Derakane 411-45 Vinyl Ester Resins—Brochures and Guides.

|  | Equivalent Weight | OH# |
|---|---|---|
| R = $CH_3$, m = 0, n = 1 | 256 | 219* |
| R = $CH_3$, m = 0, n = 2 | 265 | 212 |

*Preferred; Dow Derakane ™ 411-45.

TABLE A

Raw Materials

| Trade Name | Viscosity (cps) at 25° C. | Supplier |
|---|---|---|
| Urethane System | | |
| Poly G-70-600 polyether polyol, OH# = 600 | 280 | Olin Chemical |
| Pluracol 1010 polyether diol, OH# = 107 | 150 | BASF |
| PAPI-27 (or 94) polymeric isocyanate | 180 | Dow Chemical |
| DEOA crosslinker | diethanolamine | Union Carbide |
| Dabco T-12 | Dibutyltin dilaurate | Air Products |
| Dabco 33LV | Triethylene diamine in diethylene glycol | Air Products |
| Vinyl ester system | | |
| Derakane 411-45 | Hydrovinyl ester (in 35-50% styrene monomer) | Dow Chemical |
| Lupersol 256 (catalyst) | 2,5-Dimethyl 2,4-bis (2-ethyl hexa-noyl peroxy) hexane | Pennwalt Chemical Co. |
| Co. Naphthenate (Industrial grade) | Cobalt Naphthenate (promoter) | Mooney Chemical |
| D.M.A. (Industrial grade) | Dimethyl aniline (promoter) | J. T. Baker |
| DC-193 | Silicone Surfactant | Dow Corning |
| Composite system | | |
| Continuous roving 366-AD-113 or 670-A9 113 QP | Continuous glass strand (single end) | Owens/Corning |
| Surfacing veil NEXUS 039-10 (6 × 36 in.²) | Polyester fabric | Precision Fabrics |
| CT-2007 | Mold release agent | Chem-Trend, Inc. |
| Silicone release agent | Mold release agent | Various |

Vinyl ester was used as received. Polyols were dried under vacuum (1-3 Torr) for 2 days at 45° C. to remove moisture and other volatile impurities. Catalysts were used without further purification. Only reagent grade vinyl monomers were used.

TABLE B

Representative Types of Polar Vinyl Monomers

| Chemical Name | Chemistry Structure | Supplier |
|---|---|---|
| Methyl Methacrylate | $CH_2=C(CH_3)-C(=O)-O-CH_3$ | Rohm & Haas |
| Vinyl Acetate | $CH_2=CH-O-C(=O)-CH_3$ | Air Products and Chemicals |
| Ethyl Acrylate | $CH_2=CH-C(=O)-O-C_2H_5$ | Kodak 3159 |
| Butyl Acrylate | $CH_2=CH-C(=O)-O-C_4H_9$ | Kodak 7047 |
| Methyl Acrylate | $CH_2=CH-C(=O)-O-CH_3$ | Rohm and Haas |
| 2-Ethyl hexylacrylate | $CH_2=CH-C(=O)-O-CH_2-CH(C_2H_5)-CH_2-CH_2-CH_2-CH_3$ | Rohm & Haas |
| Allyl Alcohol | $CH_2=CH-CH_2-OH$ | Polysciences |
| Acrylamide | $CH_2=CH-C(=O)-NH_2$ | Matheson Coleman & Bell |
| Hydroxyethyl Methacrylate | $CH_2=C(CH_3)-C(=O)-O-CH_2-CH_2-OH$ | Rohm & Haas 1432 |

TABLE B-continued

Representative Types of Polar Vinyl Monomers

| Chemical Name | Chemistry Structure | Supplier |
|---|---|---|
| Ethyl Methacrylate | $CH_2=C(CH_3)-C(=O)-O-C_2H_5$ | E. I. DuPont de Nemours & Co. |
| Isobutyl Methacrylate | $CH_2=C(CH_3)-C(=O)-O-CH_2CH(CH_3)-CH_3$ | E. I. DuPont de Nemours & Co. |
| n-Butyl Methacrylate | $CH_2=C(CH_3)-C(=O)-O-C_4H_9$ | E. I. DuPont de Nemours & Co. |
| 2-Ethyl Hexylmethacrylate | $CH_2=C(CH_3)-C(=O)-O-CH_2-CH(C_2H_5)-CH_2-CH_2-CH_2-CH_3$ | E. I. DuPont de Nemours & Co. |

General Procedure

In general, and according to relatively usual procedure in the art, the reactants are prepared in the form of several admixtures of reactants, which are subsequently admixed together. The first admixture (Component A) generally comprises the selected polyol or polyol blend, the cross-linking agent if any, the hydroxyvinyl ester, the vinyl co-catalyst (usually a cobalt salt), the DMA (an auxiliary or secondary vinyl co-catalyst), the usual urethane catalyst or catalysts, and water, and the polar vinyl monomer, when included.

In the second admixture of reaction components (Component B) the isocyanate reactant and the free-radical polymerization catalyst, usually a peroxide, are combined and admixed.

Finally, the two admixtures of reactants (Component A and Component B) are brought together and thoroughly admixed.

The hydroxy vinyl ester is usually provided in solution in a liquid preferably non-hydroxy vinyl monomer, especially styrene, in which it is generally provided commercially in an amount between about 30 and about 50% by weight. In the present work, the amount of the vinyl ester in styrene was generally on the order of 42.5% by weight. Other non-hydroxyvinyl monomers which may be employed include any liquid vinyl monomer which is a fluid and in which the hydroxyvinyl resin is soluble, and which is compatible with the hydroxyvinyl monomer and with the polyurethane components, as indicated under the heading "Raw Materials".

Experimental and In General

Experimental procedures are as follows:

Component B comprises isocyanate (e.g., Isonate 143L or PAPI-27) and a free-radical initiator (e.g., Lupersol 256). Component A comprises polyol, hydroxyvinyl ester resin, urethane catalysts and free-radical promoter. Each component is premixed well. When Component B is poured into Component A, the reaction mixture is stirred immediately by high-speed mixer. After ten seconds of mixing, the mixture is poured into a mold which has preferably already been lined with glass reinforcement, and the mold is then closed immediately.

The mixture usually gels within 50-55 seconds. After seven minutes, the mold is removed from a 110° C. laboratory press and the sample is released from the mold.

After demolding, the sample is kept inside of a 70° C. oven for two hours postcuring, and then subjected to testing.

Matrix resin foams to be used for structural RIM (SRIM) are thus prepared, and the relationship between formulations and physical properties is studied.

Polyol blends, e.g., P-1010/Poly G-70-600/Derakane 411-45, and PAPI 27, produce the best mechanical properties, the system having low viscosity and enhanced impregnation into fibrous reinforcement.

The system cures rapidly, suggestive of high productivity.

Reinforced RIM Foam (RRIM Foam) Preparation Procedure

For the foam preparation, the polyol, vinyl ester resin, catalysts, surfactant, initiator and blowing agent, e.g., water, are premixed. The isocyanate is then added. After mixing, the mixture is stirred with filler, e.g., chopped fiber glass, and poured into the mold immediately. The mold is placed in a 110° C. lab-press for seven minutes, then demolded. Postcuring is carried out at 70° C. for two hours.

Preparation of Polyurethane/Hydroxyvinyl Ester Hybrid Foams—Mold Procedure

A blend component is prepared by mixing polyol, catalyst, hydroxyvinyl ester resin, free-radical initiator, promoter, surfactant, and at least water as blowing agent. Polyisocyanate is weighed in a separate container, and is then poured into the blended components and stirred for eight (8) seconds. The mixture is then poured into a mold. The mold is closed and transferred immediately to a Lab-Press TM. The mold is kept in the press for ten (10) minutes. Thereafter, the molded product is removed from the mold and kept in an oven at 70° C. for four (4) hours for postcuring.

Structural RIM (SRIM) Preparation Procedure

For structural RIM preparation, the polyol, vinyl ester resin, catalyst, initiator and selected vinyl monomer are mixed well. The continuous strand mat is dried at 70° C. for two hours and then cooled to room temperature before molding.

The full amount of isocyanate is mixed with polyol. The mixture is stirred with a 3000 RPM stirrer for ten seconds, then poured into the mold immediately. The mold is kept in a press at 110° C. for six minutes, after which it is demolded and placed in an oven at 70° C. for two hours postcuring. When powder filler is used as reinforcement, the powder filler is premixed with polyol resin.

The significant positive effect of polar vinyl co-monomers on the impact strength and flexural modulus of continuous strand and/or mat reinforced RIM appears to be due to the polarity of the copolymer which results in enhanced adhesion of the vinyl ester resins to the fibers.

Preparation of Structural Foams—Mold Procedure

As shown in the drawings, composites prepared in this study may advantageously have a surface comprising continuous roving (20) impregnated with vinyl ester resin and a second layer comprising continuous strand mat (24) impregnated with the same resin. Underneath the continuous strand mat (24) is hybrid resin foam reinforced with chopped glass fiber (26), which can be replaced by any other suitable solid particulate filler. The core foam (28) consists of matrix resin foam without reinforcement.

The said composites may be prepared according to the following procedure:

Continuous roving is wound on an aluminum mold having the dimensions of 18×5.5×0.5 inches.

A sheet of continuous strand mat is laid onto the continuous roving.

A blend composed of the hydroxyvinyl ester resin containing styrene or other polymerizable vinyl monomer, a free radical initiator, and a promoter are poured on top of the continuous strand mat. This mixture is spread and used to impregnate the blend into the continuous strand mat and continuous roving.

Thereafter, preweighed half-inch long chopped fiberglass or other solid particulate filler is spread over the vinyl ester-based blend, and a roller is used to compress the chopped glass fiber in order to attain good adhesion between the chopped glass fiber and the resin layer.

This procedure is applied to both parts of the mold, i.e., the upper part and the lower part, to make the glass fiber-reinforced skin layer.

The hybrid resin system, comprising the hydroxyvinyl ester resin system and the polyurethane foam system, is blended and poured onto the glass fiber-reinforced resin layer of the lower mold.

Immediately after pouring, the upper part of the mold is placed on the lower part of the mold, and the closed mold is kept inside of the press (Carver Laboratory Press, Model M, Fred S. Carver, Inc.) at 110° C. for twenty (20) minutes. The foam core is allowed to expand in the closed mold. After demolding, the product is transferred to an oven maintained at 70° C. for four (4) hours postcuring.

Continuous Processing

The production of these foams is advantageously carried out by means of a continuous process. In any case, whether produced by a continuous process or in molds, the exterior surface of the reinforced composites of the invention can comprise continuous fiberglass strands or yarn, with an underlying layer of fiberglass mat (preferably also continuous strand), and a further underlying layer of glass fibers or other particulate filler, also surrounding an unfilled core of the resin foam, the reinforced composite advantageously being the same on both the top and the bottom. The highly advantageous continuous process of the invention comprises the continuous metering of two components, one being the isocyanate component (Component B) and the other being the resin component (Component A), to a mixing head and the dispensing of the reaction mixture onto the double conveyor belt of a continuous molding machine which is equipped with specially designed adjustable side molding restraints which allow for the production of foams in varying widths and with predetermined edge shapes, such as ship-lap and round or square corners. Simultaneously, with the discharge of the foam components through the mixing head, glass fibers (in various forms) are continuously fed through the foam mix. Optionally, chopped fibers can be dispensed onto the conveyor belt alone or concomitantly with the continuous feeding of glass mat or matrix or glass strands onto the conveyor belt.

Component B (the isocyanate component) advantageously consists essentially of the polyisocyanate (e.g., PMDI). Typical materials are Mondur MR (Mobay Chemical Co.), PAPI 27 and 135 (Dow), or other similar materials. Also included in the isocyanate component, Component B, is the free-radical peroxide catalyst, as further described in detail elsewhere herein. A certain amount of surfactant can be added to the polyisocyanate as well as certain fillers, if desired.

Component A (the resin component) consists essentially of the combination of polyol or polyols, e.g., poly(oxypropylene) or poly(oxyetheylene) adducts such as Pluracol 1010 (BASF) having a molecular weight of about 1020, an equivalent weight of about 510, and a functionality of about 2, in admixture with Poly G-70-600 (Olin), a polyether polyol which is amine based, having a molecular weight of approximately 280, an equivalent weight of about 93, and a functionality of about 3, such combination of polyols representing a preferred embodiment of the invention and the equivalent weight ratios of these polyols preferably being between about 1/1 and 3/1, most preferably about 2/1, an excessive amount of amine-based polyol or polyol having a functionality in excess of 3 resulting in excessively brittle resins and an excessively high reaction rate. Also in the resin component, Component A, is the hydroxyvinyl ester, any polar monomer to be included, and water together with any additional blowing agent to be employed. Additionally included is the catalyst (urethane catalyst or combinations, together with promoter or cocatalyst and DMA), surfactant(s), e.g., DC-193 or L-5340 (Dow Corning, Union Carbide), fillers, such as wollastonite (Wollastokup TM) (Nyco), Hydrafil TM (alumina trishydrate, Great Lakes Mineral), fiberglass fibers or other fillers, as well as any additional flame-retardant. The amount of fillers and/or fibers in the resin component can vary between about 10 and about 50 percent and may depend upon the viscosity of the resulting mix. As mentioned previously, some fillers can be added to the isocyanate component. It is usually advantageous to keep the resin mix agitated in order to avoid settling of any inorganic fillers.

The resin component is, advantageously, maintained at a temperature between about 30 and about 60° C., although the temperature can be somewhat higher if a lower viscosity is desired.

The height and the width of the continuously-formed foam composites (foam plus fillers and/or fibers) can be varied depending upon the height and width of the double belt conveyor used. A heating zone through which the foam composites are moved is kept preferentially between about 60 and about 80° C. The foam composites are then cut to specified dimensions and stored at room temperature.

The foam composites can be coated with a urethane coating consisting of foam components minus the blowing agents, surfactants, and fillers, or with other suitable urethane or modified urethane coatings, and even with a surfacing veil of polyester fabric or the like, to improve the appearance and for protection against UV light. UV stabilizers and antioxidants can be added to these coating systems. Such coatings and/or veils can be applied directly on a foaming line (conveyor belt) or after the foam composites have come out of the heating zone.

It is also a preferred aspect of this invention to saturate or wet out the continuous glass strands, prior to introduction to the foam being discharged through the mixing head, with a polymer specially formulated to provide a hard, dense surface on the order of 5 to 50 mil thick, which will result in an extremely durable wear surface, as well as extend the environmental (outdoor weathering) properties. The polymers can be applied by either a dip or spray process and can include the polymers employed for foaming (without foaming agent), acrylates, acrylic modified unsaturated polyesters, and/or aliphatic polyisocyanate modified urethanes, with or without added filler. By controlling the catalysis of the selected polymer, the length of the reaction time can be adjusted to coincide with that of the high density foam as it proceeds through the heated pressure conveyor, resulting in an outer skin composite.

DETAILED DESCRIPTION OF THE DRAWINGS

Figure 2:
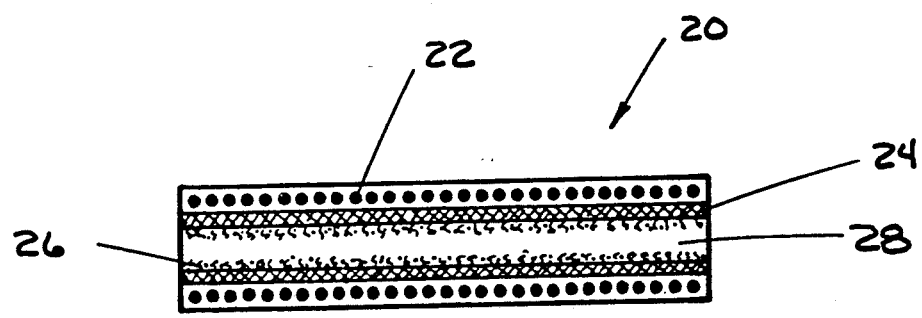
FIG. 2 is a cross-section of the composite.

Referring now to the drawings, FIG. 1 shows at 10 a reinforced foam composite in accord with the invention and FIG. 2 shows at 20 a cross-sectional area of the composite, in which 22 indicates continuous fiberglass roving, 24 indicates continuous strand mat, 26 indicates chopped glass fiber or other particulate filler, and 28 indicates a foam core which is unfilled, this particular structure comprising one preferred embodiment of the present invention from the standpoint of its structural aspects.

DESCRIPTION OF THE PREFERRED EMBODIMENTS

The invention can be more fully understood by reference to the following examples. The parts and percentages herein are by weight unless otherwise specified.

EXAMPLE 1

A polyol blend (Component A) is prepared by blending 100 parts of a diol (Pluracol 1010, BASF polyether diol, equivalent weight 510, and hydroxyl functionality of 2) and 100 parts of a polyol, Poly G-70-600 (Olin-polyether triol, hydroxy no. 600, equivalent weight 93), and 200 parts of Derakane 411-45 TM -Dow-42.5% solution in styrene. Additionally, three (3) parts of diethanolamine crosslinker are introduced into this polyol blend.

Then, into the polyol blend, 1 part of silicone surfactant DC-193 (Dow Corning), 0.2 part of urethane catalyst Dabco 33LV (Air Products), and 0.04 part of urethane catalyst Dabco T-12 (dibutyltin dilaurate—Air Products) and water (0.23 parts) as a blowing agent to give a density of about 42.3 lbs/cu. ft., are blended.

Component B is prepared by blending 198 parts of polymeric isocyanate PAPI 27, equivalent weight 133.3 (Dow), and free radical initiator in the form of Lupersol 256 (4 parts) plus <0.4 part of cobalt naphthanate and 0.4 part of DMA, thereby completing the composition of Component B. NCO/OH Equivalent Ratio 0.853. Isocyanate Index 85.3.

Components A and B are weighed separately, mixed, and about 5 percent by weight of one-half inch long chopped fiberglass added, the mixture stirred for about 25 seconds and then charged into a mold and heated at 70° C. for 5 minutes.

The composite has its two opposed main surface layers reinforced by continuous glass fiber strands arranged longitudinally. The content of continuous glass fiber strand in the composite is approximately ten percent, based on the total weight. The glass fiber strands employed are an Owens Corning Fiberglas Corporation product, article number 670-A9 113 QP or, alternatively, 366-AD-113 or 965-AA113. Such products are made up of glass fiber strands or yarn (small bundles of monofilaments) bundled together to form a large bundle of about three-sixteenths of an inch in diameter and these strands or yarns are kept at one-fourth inch intervals center to center, just beneath both surfaces. In cases where different properties are required, the centers can be one-half to three-eighths inch apart.

Beneath this outer layer is preferably located fiberglass mat, usually having continuous strands. An underlying layer of chopped fiberglass or other particulate filler, such as trishydrated alumina (Hydrafil) and Wollastokup, makes up the interior layer surrounding the unfilled foam core. The structure is the same on both sides of the reinforced composite product due to preparation and lining of the interior mold surfaces.

The foam as it comes out of the mold has a thickness of 1.25 inches and a width of three inches and is cut into ten inch lengths. The resulting product is suitable for use as a material of construction in lieu of wood but with improved resistance to weathering and chemicals.

Test results are found in the Table headed "Table 1" as well as in the Table headed "EXAMPLE 1" itself.

EXAMPLE 2

The procedure of Example 1 is followed using the materials and proportions for the core, filler, and skin as set out in the Table headed EXAMPLE 2. The glass strands are completely wet out (saturated) with the same resin polymer as used for the foam without filler or blowing agent. The foam is 1¼×3×10 inches. Some results of testing of the composite products of EXAMPLE 2 are given in Table 2, as well as in the Table headed "EXAMPLE 2" itself.

EXAMPLES 3-6

The procedure of EXAMPLE 1 is repeated using materials and proportions given in the Tables headed EXAMPLES 3 through 6, which follow. The amounts and proportions of fillers may be varied from example to example and may include wollastonite or other usual particulate fillers and trishydrated alumina or other flame retardant in addition to or in place of chopped fiberglass. Test results on the composite products of EXAMPLES 3-6 are reported in Tables 3-6 as well as in the Tables headed EXAMPLE 3, 4, 5, and 6 themselves.

As will be noted, Examples 5 and 6 include polar vinyl monomer (representatively 2-hydroxyethyl methacrylate) in both core foam and skin, the polar vinyl monomer being included in Component A with polyol reactants from a processing standpoint.

Comparative Tables

In Tables 7 and 8 are shown comparative flexural modulus and stress test results for treated pine as well as nail withdrawal test results for pine, treated pine, and the reinforced foam composites of Examples 1 through 6. From these Tables, the advantageous properties of reinforced foam composites of the invention from the standpoint of load deflection capacity, flexural modulus and stress, and nail-holding capacity, are apparent.

In the Tables, as well as in Tables headed EXAMPLES 1-6, the ASTM test procedures employed for the physical characteristics reported, were as follows:
Density ASTM-1622-63; ASTM-3574-81.
Izod Impact Strength ASTM-0-256-81.
  Dimensions: 0.5in.×0.5in.×2.5in.
  Full Scale: 200in.=lbs.
Flexural Modulus ASTM-0/790-81.
  Dimensions: 5.5in.×1.0in.×17.0in.
  Supporting Span: 12.0in.
Flexural Strength ASTM-0/790-81.

EXAMPLE 1 Formulation of Synthetic Wood of V-1221

| FORMULATION NO. | V-1221 (skin) | V-1221 (core) |
|---|---|---|
| Derakane 411-45 (g) | 300 | 200 |
| Co. Nap. (g) | 0.4 | 0.4 |
| D.M.A. (g) | 0.4 | 0.4 |
| Lupersol 256 (g) | 4.0 | 4.0 |
| Pluracol-1010 (g) | 0 | 100 |
| DEOA (g) | 0 | 3.0 |
| Dabco 33LV (g) | 0 | 0.2 |
| Dabco T-12 (g) | 0 | 0.04 |
| Poly G-70-600 (g) | 0 | 100 |
| $H_2O$ (g) | 0 | 0.23 |
| Continuous roving (g) 670-A9 113 QP | 286 | 0 |
| NCO/OH Ratio = 0.853 NCO Index 85.3 | | |
| ¼" chopped fiber glass (g) | 50 | 0 |
| PAPI-27 (g) | | 198 |
| Cream time (sec.) | | 25 |
| Rise time (sec.) | | 45 |
| Tackfree time (sec.) | | 50 |
| Processing: | | |
| Room temperature (C.) | | 24 |
| Mold temperature (C.) | | 110 |
| Time in mold (min.) | | 20 |
| 70 C./post-curing (hr.) | | 4.0 |
| Physical properties: | | |
| Density (p.c.f.) | | 42.3 |
| Izod Impact Strength (ft.-pound/in.) | | 31.4 |
| Flexural modulus (psi) | | 1,087,500 |
| Flexural stress (psi) | | 17,700 |

*wt. % of glass fiber = 31%

EXAMPLE 2 Formulation of synthetic wood of V-1222

| FORMULATION NO. | V-1222 (skin) | V-1222 (core) |
|---|---|---|
| Derakane 411-45 (g) | 400 | 200 |
| Co. Nap. (g) | 0.4 | 0.4 |
| D.M.A. (g) | 0.4 | 0.4 |
| Lupersol 256 (g) | 4.0 | 4.0 |
| Pluracol-1010 (g) | 0 | 100 |
| DEOA (g) | 0 | 3.0 |
| Dabco 33LV (g) | 0 | 0.2 |
| Dabco T-12 (g) | 0 | 0.04 |
| Poly G-70-600 (g) | 0 | 100 |
| $H_2O$ (g) | 0 | 0.45 |
| Continuous roving 670-A9 113 QP | 286 | 0 |
| Continuous strand mat M8610 (g) | 55.8 | 0 |
| ¼" chopped fiber glass (g) | 50 | 0 |
| NCO/OH Ratio 0.856 NCO Index 85.6 | | |
| PAPI-27 (g) | | 201.7 |
| Cream time (sec.) | | 25 |
| Rise time (sec.) | | 45 |
| Tackfree time (sec.) | | 50 |
| Processing: | | |
| Room temperature (C.) | | 25 |
| Mold temperature (C.) | | 110 |
| Time in mold (min.) | | 20 |
| 70 C./post-curing (hr.) | | 4.0 |
| Physical properties: | | |
| Density (p.c.f.) | | 43.6 |
| Izod Impact Strength (ft-pound/in) | | 33.3 |
| Flexural modulus (psi) | | 954,000 |
| Flexural stress (psi) | | 21,900 |

*wt. % of glass fiber = 35.1%

EXAMPLE 3 Formulation of Synthetic Wood of V-1223

| FORMULATION NO. | V-1223 (skin) | V-1223 (core) |
|---|---|---|
| Derakane 411-45 (g) | 400 | 200 |
| Co. Nap. (g) | 0.4 | 0.4 |
| D.M.A. (g) | 0.4 | 0.4 |
| Lupersol 256 (g) | 4.0 | 4.0 |
| Pluracol-1010 (g) | 0 | 100 |
| DEOA (g) | 0 | 3.0 |
| Dabco 33LV (g) | 0 | 0.2 |
| Dabco T-12 (g) | 0 | 0.04 |
| Poly G-70-600 (g) | 0 | 100 |
| $H_2O$ (g) | 0 | 0.90 |
| Continuous roving 670-A9 113 QP | 286 | 0 |
| Continuous strand mat M8610 (g) | 58 | 0 |
| ¼" chopped fiber glass (g) | 50 | 0 |
| NCO/OH Ratio 0.860 NCO Index 86 | | |
| PAPI-27 (g) | | 208 |
| Cream time (sec.) | | 25 |
| Rise time (sec.) | | 45 |
| Tackfree time (sec.) | | 50 |
| Processing: | | |
| Room temperature (C.) | | 25 |
| Mold temperature (C.) | | 110 |
| Time in mold (min.) | | 20 |
| 70 C./post-curing (hr.) | | 4.0 |
| Physical properties: | | |
| Density (p.c.f.) | | 42.5 |

EXAMPLE 3 Formulation of Synthetic Wood of V-1223

| FORMULATION NO. | V-1223 (skin) | V-1223 (core) |
|---|---|---|
| Izod Impact Strength (ft-pound/in) | | 33.3 |
| Flexural modulus (psi) | | 946,000 |
| Flexural stress (psi) | | 18,130 |

*wt. % of glass fiber = 36.2%

EXAMPLE 4 Formulation of synthetic wood of V-1224

| FORMULATION NO. | V-1224 (skin) | V-1224 (core) |
|---|---|---|
| Derakane 411-45 (g) | 400 | 200 |
| Co. Nap. (g) | 0.4 | 0.4 |
| D.M.A. (g) | 0.4 | 0.4 |
| Lupersol 256 (g) | 4.0 | 4.0 |
| Pluracol-1010 (g) | 0 | 100 |
| DEOA (g) | 0 | 3.0 |
| Dabco 33LV (g) | 0 | 0.2 |
| Dabco T-12 (g) | 0 | 0.04 |
| Poly G-70-600 (g) | 0 | 100 |
| H$_2$O (g) | 0 | 0.90 |
| Continuous roving 670-A9 113 QP | 286 | 0 |
| Continuous strand mat M8610 (g) | 58 | 0 |
| ¼" chopped fiber glass (g) | 100 | 0 |
| NCO/OH Ratio 0.860 NCO Index 86 | | |
| PAPI-27 (g) | | 208 |
| Cream time (sec.) | | 25 |
| Rise time (sec.) | | 45 |
| Tackfree time (sec.) | | 50 |
| Processing: | | |
| Room temperature (C.) | | 25 |
| Mold temperature (C.) | | 110 |
| Time in mold (min.) | | 20 |
| 70 C./post-curing (hr.) | | 4.0 |
| Physical properties: | | |
| Density (p.c.f.) | | 45.6 |
| Izod Impact Strength (ft-pound/in) | | 33.3 |
| Flexural modulus (psi) | | 1,007,700 |
| Flexural stress (psi) | | 22,300 |

*wt. % of glass fiber = 38%

EXAMPLE 5 Formulation of Synthetic Wood of V-1233

| FORMULATION NO. | V-1233 (skin) | V-1233 (core) |
|---|---|---|
| Derakane 411-45 (g) | 400 | 200 |
| Co. Nap. (g) | 0.4 | 0.4 |
| D.M.A. (g) | 0.4 | 0.4 |
| Lupersol 256 (g) | 4.0 | 4.0 |
| Pluracol-1010 (g) | 0 | 100 |
| DEOA (g) | 0 | 3.0 |
| Dabco 33LV (g) | 0 | 0.2 |
| Dabco T-12 (g) | 0 | 0.04 |
| Poly G-70-600 (g) | 0 | 100 |
| H$_2$O (g) | 0 | 0.90 |
| Continuous roving 670-A9 113 QP | 283 | 0 |
| Continuous strand mat M8610 (g) | 52.5 | 0 |
| ¼" chopped fiber glass (g) | 100 | 0 |
| 2-Ethylhexyl Acrylate (g) | 20 | 20 |
| wt. % of glass fiber | | 37.8 |
| wt. % of total 2-ethylhexyl acrylate | | 2.70 |
| NCO/OH Ratio 0.876 NCO Index 87.6 | | |
| PAPI-27 (g) | | 212 |
| Cream time (sec.) | | 22 |
| Rise time (sec.) | | 45 |
| Tackfree time (sec.) | | 50 |
| Processing: | | |
| Room temperature (C.) | | 30 |
| Mold temperature (C.) | | 110 |
| Time in mold (min.) | | 20 |
| 70 C./post-curing (hr.) | | 4.0 |
| Physical properties: | | |
| Density (p.c.f.) | | 44.9 |
| Izod Impact Strength (ft.-pound/in.) | | 33.3 |
| Flexural modulus (psi) | | 939,100 |
| Flexural stress (psi) | | 18,000 |

EXAMPLE 6 Formulation of Synthetic Wood of V-1234

| FORMULATION NO. | V-1234 (skin) | V-1234 (core) |
|---|---|---|
| Derakane 411-45 (g) | 400 | 200 |
| Co. Nap. (g) | 0.4 | 0.4 |
| D.M.A. (g) | 0.4 | 0.4 |
| Lupersol 256 (g) | 4.0 | 4.0 |
| Pluracol-1010 (g) | 0 | 100 |
| DEOA (g) | 0 | 3.0 |
| Dabco 33LV (g) | 0 | 0.2 |
| Dabco T-12 (g) | 0 | 0.04 |
| Poly G-70-600 (g) | 0 | 100 |
| H$_2$O (g) | 0 | 0.90 |
| Continuous roving 670-A9 113 QP | 279 | 0 |
| Continuous strand mat M8610 (g) | 50.9 | 0 |
| ¼" chopped fiber glass (g) | 100 | 0 |
| 2-Hydroxyethyl methacrylate | 20 | 20 |
| wt. % of glass fiber | | 38.8 |
| wt. % of total 2-Hydroxyethyl methacrylate | | 2.63 |
| NCO/OH Ratio 0.904 NCO Index 90.4 | | |
| PAPI-27 (g) | | 237.2 |
| Cream time (sec.) | | 23 |
| Rise time (sec.) | | 47 |
| Tackfree time (sec.) | | 53 |
| Processing: | | |
| Room temperature (C.) | | 30 |
| Mold temperature (C.) | | 110 |
| Time in mold (min.) | | 20 |
| 70 C./post-curing (hr.) | | 4.0 |
| Physical properties: | | |
| Density (p.c.f.) | | 43.2 |
| Izod Impact Strength (ft.-pound/in.) | | 33.3 |
| Flexural modulus (psi) | | 824,000 |
| Flexural stress (psi) | | 18,200 |

TABLE 1

Load vs. deflection of V-1221 synthetic wood
Sample size: 17" × 5.5" × 1.0" (in.)$^3$
Supporting span: 12 in.

| Deflection (in.) | Load (lb.) |
|---|---|
| 0.01 | 70 |
| 0.02 | 190 |
| 0.05 | 550 |
| 0.07 | 830 |
| 0.10 | 1280 |
| 0.13 | 1680 |
| 0.17 | 2280 |
| 0.20 | 2740 |
| 0.23 | 3240 |
| 0.26 | 3580 |
| 0.28 | 3870 |
| 0.30 | 4160 |
| 0.31 | 4340 |
| 0.34 | 4750 |
| 0.35 | 4880 |

TABLE 1-continued

Load vs. deflection of V-1221 synthetic wood
Sample size: $17'' \times 5.5'' \times 1.0''$ (in.)$^3$
Supporting span: 12 in.

| Deflection (in.) | Load (lb.) |
|---|---|
| 0.36 | 5010 |
| 0.37 | 5180 |
| 0.38 | 5310 |
| 0.39 | 5400 (break) |

TABLE 2

Load vs. deflection of V-1222 synthetic wood
Sample size: $17'' \times 5.5'' \times 1.0''$ (in.)$^3$
Supporting span: 12 in.

| Deflection (in.) | Load (lb.) |
|---|---|
| 0.01 | 160 |
| 0.03 | 320 |
| 0.05 | 550 |
| 0.08 | 990 |
| 0.10 | 1230 |
| 0.15 | 1980 |
| 0.20 | 2720 |
| 0.24 | 3240 |
| 0.28 | 3790 |
| 0.30 | 4070 |
| 0.33 | 4440 |
| 0.34 | 4580 |
| 0.36 | 4870 |
| 0.38 | 5050 |
| 0.41 | 5340 |
| 0.43 | 5650 |
| 0.46 | 5970 |
| 0.49 | 6240 |
| 0.52 | 6530 |
| 0.55 | 6680 (break) |

TABLE 3

Load vs. deflection of V-1223 synthetic wood
Sample size: $17'' \times 5.5'' \times 1.0''$ (in.)$^3$
Supporting span: 12 in.

| Deflection (in.) | Load (lb.) |
|---|---|
| 0.02 | 210 |
| 0.05 | 570 |
| 0.08 | 970 |
| 0.13 | 1650 |
| 0.15 | 1950 |
| 0.17 | 2220 |
| 0.20 | 2620 |
| 0.25 | 3270 |
| 0.30 | 3890 |
| 0.32 | 4150 |
| 0.35 | 4490 |
| 0.37 | 4700 |
| 0.40 | 5010 |
| 0.42 | 5220 |
| 0.44 | 5410 |
| 0.46 | 5540 (break) |

TABLE 4

Load vs. deflection of V-1224 synthetic wood
Sample size: $17'' \times 5.5'' \times 1.0''$ (in.)$^3$
Supporting span: 12 in.

| Deflection (in.) | Load (lb.) |
|---|---|
| 0.02 | 210 |
| 0.05 | 650 |
| 0.08 | 1050 |
| 0.10 | 1410 |
| 0.15 | 2120 |
| 0.18 | 2540 |
| 0.20 | 2860 |

TABLE 4-continued

Load vs. deflection of V-1224 synthetic wood
Sample size: $17'' \times 5.5'' \times 1.0''$ (in.)$^3$
Supporting span: 12 in.

| Deflection (in.) | Load (lb.) |
|---|---|
| 0.25 | 3520 |
| 0.28 | 3920 |
| 0.30 | 4220 |
| 0.32 | 4450 |
| 0.35 | 4870 |
| 0.37 | 5120 |
| 0.40 | 5490 |
| 0.43 | 5840 |
| 0.45 | 6080 |
| 0.48 | 6360 |
| 0.50 | 6550 |
| 0.510 | 6660 |
| 0.530 | 6800 (break) |

TABLE 5

Load vs. deflection of V-1233 sy
Sample size: $17.75'' \times 5.5'' \times 1$
Supporting span: 12 in.

| Deflection (in.) | Load (lb.) |
|---|---|
| 0.01 | 110 |
| 0.05 | 440 |
| 0.10 | 1000 |
| 0.15 | 1670 |
| 0.20 | 2350 |
| 0.23 | 2730 |
| 0.25 | 2990 |
| 0.28 | 3370 |
| 0.30 | 3630 |
| 0.32 | 3900 |
| 0.34 | 4140 |
| 0.36 | 4370 |
| 0.38 | 4610 |
| 0.40 | 4860 |
| 0.42 | 5070 |
| 0.44 | 5290 |
| 0.46 | 5500 crack |

TABLE 6

Load vs. deflection of V-1234 synthetic wood
Sample size: $17'' \times 5.5'' \times 1.0''$ (in.)$^3$
Supporting span: 12 in.

| Deflection (in.) | Load (lb.) |
|---|---|
| 0.01 | 110 |
| 0.05 | 520 |
| 0.10 | 1100 |
| 0.13 | 1460 |
| 0.15 | 1700 |
| 0.20 | 2300 |
| 0.25 | 2870 |
| 0.28 | 3220 |
| 0.30 | 3420 |
| 0.33 | 3760 |
| 0.35 | 3970 |
| 0.37 | 4170 |
| 0.40 | 4470 |
| 0.42 | 4650 |
| 0.45 | 4910 |
| 0.47 | 5090 |
| 0.50 | 5340 |
| 0.52 | 5480 |
| 0.53 | 5560 (crack) |

TABLE 7

Deflection vs. load for treated pine wood
Size of sample: 17.0" × 5.31" × 1"
Supporting span: 12"
Method of testing: Flexural Modulus & Stress

| Treated Pine-1 | | Treated Pine-2 | |
|---|---|---|---|
| Deflection (in.) | Load (lb.) | Deflection (in.) | Load (lb.) |
| 0.03 | 500 | 0.05 | 640 |
| 0.05 | 980 | 0.08 | 1080 |
| 0.07 | 1130 | 0.12 | 1760 |
| 0.10 | 1680 | 0.15 | 2190 |
| 0.14 | 2390 | 0.19 | 2730 |
| 0.17 | 2920 | 0.20 | 2900 |
| 0.20 | 3380 | 0.23 | 3240 |
| 0.23 | 3840 | 0.25 | 3440 |
| 0.25 | 3980 | 0.27 | 3660 (break) |
| 0.27 | 4100 (break) | | |
| Flexural stress: (psi) | 13,400 | | 12,000 |
| Flexural modulus: (psi) | 1,193,000 | | 1,065,000 |
| Average flexural stress: (psi) | | 12,700 | |
| Average flexural modulus: (psi) | | 1,129,000 | |

TABLE 8

Comparison of Nail Withdrawal Test between Natural Woods and Synthetic Woods

| Formulation No. | Density (p.c.f.) | Box nail (lb.) | Screw drywall nail (lb.) | Ring-shank drywall nail (lb.) |
|---|---|---|---|---|
| Pine | 33 | 42 | 26 | 56 |
| Treated Pine | 28.4 | 17 | 27 | 48 |
| V-1221 | 42.3 | 69 | 72 | 120 |
| V-1222 | 43.6 | 52 | 65 | 119 |
| V-1223 | 42.5 | 61 | 71 | 114 |
| V-1224 | 45.6 | 40 | 62 | 126 |
| V-1233 | 44.9 | 72 | 80 | 83 |
| V-1234 | 43.2 | 62 | 80 | 99 |

Some advantages of foams and reinforced foams of the present invention include, inter alia, especially as compared with natural and treated wood:

i) Dimensional stability.

Composite foams according to the present invention have excellent dimensional stability when compared with natural wood products.

ii) Water absorption.

Water absorption of composites of the invention is much less than that of natural wood.

iii) Weatherability (Fungal and chemical resistance).

Composites of the invention have advantages with respect to chemical and fungal resistance.

iv) High Load-Deflection Capacity.

v) High Impact Resistance and Flexural Modulus and Stress.

vi) High Nail-Holding Capacity.

In view of the foregoing advantages, the foam products of the invention are recommended for applications in the following areas, inter alia:

a. Joists.
b. Railroad ties.
c. Truck beds (floor, flap).
d. Sewage applications, e.g., oil separation tank, deodorization lid, flow-regulation board, agitation blade.
e. Sport facilities including backboards and screens for stadiums.
f. Marine materials, e.g., boat decks, ship bulkheads.
g. Corrosion-free construction materials for
h. Agriculture (e.g., barn, stable, storage bin construction materials).
i. Fishing facilities, e.g. nursery tanks, boat accessories.

In conclusion, from the foregoing, it is apparent that the present invention provides a novel polyurethane/hydroxyvinyl ester-vinyl copolymer hybrid foam and reinforced structural foam systems embodying the same, having a density between about 20 and 100 pounds per cubic foot and which preferably are presented in the form of one of the preferred embodiments set forth in greater detail in the foregoing, as well as a method of producing applications of the same, all having the foregoing enumerated characteristics and advantages.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

We claim:

1. A high-density foam formed by foaming, with an amount of foaming agent such that the density is at least twenty pounds per cubic foot, a foam composition comprising:

(A) a foam-forming organic polyisocyanate component having a functionality greater than two;

(B) a polyol component having a functionality at least two and an equivalent weight between about 300 and about 1,000;

(C) a urethane catalyst;

(D) a surfactant suitable for use in urethane foams;

(E) water as blowing agent; (F) a hydroxyvinyl ester having the formula

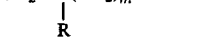

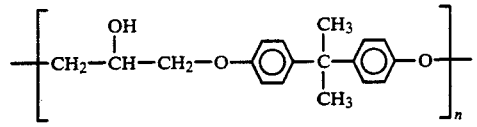

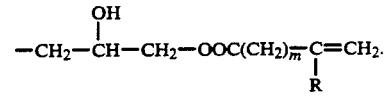

wherein n is 1 or 2, m is 0 or 1 through 4, R=H or $C_{1-4}$ alkyl, dissolved in a liquid vinyl monomer in an amount up to about 50% by weight of the hydroxyvinyl ester, the vinyl ester solution being present in an amount between about 0.3 to 1 and about 0.8 to 1 by weight with reference to components (A) and (B) combined;

(G) a free-radical initiator catalyst, the isocyanate component (A), and the combined components (B), (C), and (E), being in proportions which provide an isocyanate index between about 50 and about 300, said composition having a consistency such that fillers and reinforcing fibers can be suspended therein in an amount of about 10 to about 50 percent based on the total weight of the composition.

2. A foam of claim 1 wherein the foam comprises also a polar vinyl comonomer (H) in an amount between about 5 and 15 percent by weight of the hydroxyvinyl ester reactant (F).

3. A foam of claim 1 wherein the foam comprises also a polar vinly comonomer (H) in an amount between about 5 and 15 percent by weight of the hydroxyvinyl ester reactant (F) and comprises also up to about 5% by weight of polyol (B) of a cross-linking agent (I).

4. A foam of claim 1 or 2 or 3 wherein the foam comprises also a polar vinyl comonomer (H) in an amount between about 5 and 15 percent by weight of the hydroxyvinyl ester reactant (F), and wherein the ratio by weight of component (F) and any polar vinyl comonomer (H) present to polyurethane polymer components (A) and (B) is between about 0.33 to 1 and 0.9 to 1.

5. A foam of claim 1 wherein the foam comprises also a polar vinyl comonomer (H) in an amount between about 5 and 15 percent by weight of the hydroxyvinyl ester reactant (F) and has a density between about 20 and 66 pounds per cubic foot without added fillers and reinforcing fibers.

6. A foam of claim 1 wherein the foam comprises also a polar vinyl comonomer (H) in an amount between about 5 and 15 percent by weight of the hydroxyvinyl ester reactant (F) and has a density between about 22 and 100 pounds per cubic foot with added fillers and reinforcing fibers.

7. The foam of any of claims 2, 3, 5, or 6, wherein the amount of the polar vinyl comonomer (H) is about 10% by weight of the hydroxyvinyl ester reactant (F).

8. A foam of claim 2, wherein the hydroxyvinyl ester (F) is in solution in styrene up to about 50% by weight of the hydroxyvinyl ester and wherein the polar vinyl comonomer (H) and the styrene copolymerize.

9. A foam of claim 1, wherein the polyol component (B) has an equivalent weight of about 500.

10. A foam of claim 1, wherein the isocyanate index is about 75 to 120.

11. A foam of claim 1, wherein the vinyl ester (F) solution is present in amount of about 0.5–0.6 to 1 by weight with reference to components (A) and (B) combined.

12. A foam of claim 4, wherein the ratio by weight of hydroxyvinyl ester (F) solution components and any polar vinyl comonomer (H) present to polyurethane polymer components (A) and (B) is about 0.6 to 1.

13. A foam of claim 1 wherein, besides free-radical initiator catalyst (G), a cocatalyst is also present.

14. A foam of claim 13, wherein the cocatalyst is a cobalt salt.

15. A foam of claim 14, wherein dimethylaniline (DMA) is also present and wherein the weight ratio of catalyst, cobalt salt, and DMA is 10:0.5:0.5 to 10:2:2.

16. A foam of claim 15, wherein the ratio is about 10:1:1.

17. A foam of claim 1, wherein in the Formula for (F) n=1, R=methyl, and m=O.

18. A foam of claim 4, wherein in the Formula for (F) n=1, R=methyl, and m=O.

19. A foam of claim 1, wherein the polyol component (B) comprises a plurality of polyols.

20. A foam of claim 4, wherein the polyol component (B) comprises a plurality of polyols.

21. A foam of claim 19, wherein the polyols comprise a blend of a diol and an amine-based polyol.

22. A foam of claim 20, wherein the polyols comprise a blend of a diol and an amine-based polyol.

23. A foam of claim 21, wherein the equivalent weight ratio of the diol to the polyol is about 1:1 to 3:1.

24. A foam of claim 22, wherein the equivalent weight ratio of the diol to the polyol is about 1:1 to 3:1.

25. A foam of claim 23, wherein the ratio is about 2:1.

26. A foam of claim 24, wherein the ratio is about 2:1.

27. A foam of claim 1, wherein the polyol component (B) is a blend of a diol having an equivalent weight of about 500 and an amine-base polyol having an equivalent weight of about 100 and the organic polyisocyanate component (A) is a polymeric isocyanate (PMDI).

28. A foam of claim 4, wherein the polyol component (B) is a blend of a diol having an equivalent weight of about 500 and an amine-based polyol having an equivalent weight of about 100 and the organic polyisocyanate component (A) is a polymeric isocyanate (PMDI) having an NCO functionality greater than two.

29. A foam of claim 2, wherein the polar vinyl monomer is selected from the group consisting of:
methyl methacrylate, vinyl acetate, ethyl acrylate, butyl acrylate, methyl acrylate, 2-ethyl hexylacrylate, allyl alcohol, acrylamide, 2-hydroxyethyl methacrylate, ethyl methacrylate, isobutyl methacrylate, n-butyl methacrylate, and 2-ethyl hexylmethacrylate.

30. A foam of claim 4, wherein the polar vinyl monomer is selected from the group consisting of:
methyl methacrylate, vinyl acetate, ethyl acrylate, butyl acrylate, methyl acrylate, 2-ethyl hexylacrylate, allyl alcohol, acrylamide, 2-hydroxyethyl methacrylate, ethyl methacrylate, isobutyl methacrylate, n-butyl methacrylate, and 2-ethyl hexylmethacrylate.

31. A foam of claim 28, wherein the polar vinyl monomer is selected from the group consisting of:
methyl methacrylate, vinyl acetate, ethyl acrylate, butyl acrylate, methyl acrylate, 2-ethyl hexylacrylate, allyl alcohol, acrylamide, 2-hydroxyethyl methacrylate, ethyl methacrylate, isobutyl methacrylate, n-butyl methacrylate, and 2-ethyl hexylmethacrylate.

32. A high-density foam of claim 1, wherein the composition contains, based on the total weight of the composition, about 10 to about 40 percent each of one or more mineral fillers and not more than about 50 percent of mineral fillers and reinforcing glass fibers combined.

33. A high-density foam of claim 4, wherein the composition contains, based on the total weight of the composition, about 10 to about 40 percent each of one or more mineral fillers and not more than about 50 percent of mineral fillers and reinforcing glass fibers combined.

34. A high-density foam of claim 32 in which the mineral fillers comprise wollastonite and trishydrated alumina.

35. A high-density foam of claim 33 in which the mineral fillers comprise wollastonite and trishydrated alumina.

36. A high-density foam of claim 1, wherein the composition contains, based on the total weight of the composition, about 10 to about 50 percent of reinforcing glass fibers.

37. A high-density foam of claim 2, wherein the composition contains, based on the total weight of the composition, about 10 to about 50 percent of reinforcing glass fibers.

38. A high-density foam of claim 1 in which the high-density foam comprises continuous fiberglass strands, yarn, or mats disposed therein.

39. A high-density foam of claim 2 in which the high-density foam contains continuous fiberglass strands or yarn longitudinally-disposed therein.

40. A high-density foam of claim 38 wherein the high-density foam has a skin on each of longitudinally-disposed, parallel surfaces and contains longitudinally-disposed, parallel fiberglass strands or yarn in or adjacent said skin surfaces and spaced closely together across the width thereof.

41. A high-density foam of claim 39 wherein the high-density foam has a skin on each of longitudinally-disposed, parallel surfaces and contains longitudinally-disposed, parallel fiberglass strands or yarn in or adjacent said skin surfaces and spaced closely together across the width thereof.

42. A high-density foam of claim 40 wherein the fiberglass strands or yarn are flattened in side-by-side relation to give surface skins in which the fiberglass continuous strands or yarn are in close proximity or near contact.

43. A high-density foam of claim 41 wherein the fiberglass strands or yarn are flattened in side-by-side relation to give surface skins in which the fiberglass continuous strands or yarn are in close proximity or near contact.

44. A high-density foam of claim 40 wherein the density of the high-density foam is greater than about 40 pounds per cubic foot.

45. A high-density foam of claim 41 wherein the density of the high-density foam is greater than about 40 pounds per cubic foot.

46. A reinforced structural foam composite comprising a central core of unfilled foam as defined in claim 1, an outer skin of continuous fiberglass roving, an inner layer of fiberglass mat located beneath said skin of continuous fiberglass roving, and a layer of foam core impregnated with chopped glass fiber or other filler material beneath said continuous strand mat layer.

47. A composite of claim 46, wherein the structure of the composite is identical on both the top and bottom thereof.

48. A composite of claim 46, wherein the continuous fiberglass roving is flattened in side-by-side relation to give a surface skin in which the fiberglass continuous strands or yarn are in close proximity or in near contact.

49. A composite of claim 47, wherein the continuous fiberglass roving is flattened in side-by-side relation to give a surface skin in which the fiberglass continuous strands or yarn are in close proximity or in near contact.

50. A composite of claim 48, wherein the density of the foam is between about 22 and 100 pounds per cubic foot.

51. A composite of claim 49, wherein the density of the foam is between about 22 and 100 pounds per cubic foot.

52. A composite of claim 50, wherein the foam core has a density between about 20 and 66 pounds per cubic foot.

53. A composite of claim 51, wherein the foam core has a density between about 20 and 66 pounds per cubic foot.

* * * * *

UNITED STATES PATENT AND TRADEMARK OFFICE
CERTIFICATE OF CORRECTION

PATENT NO. : 5,091,436
DATED : Feb. 25, 1992
INVENTOR(S) : Kurt C. Frisch, Kaneyoshi Ashida It is certified that error appears in the above-identified patent and that said Letters Patent is hereby corrected as shown below:

Title Page, Column 1, [76] Inventors:, line 3; "28139" should read -- 18139 --.
Title Page, [57], ABSTRACT, line 13; "baords" should read --boards--.
Column 3, line 13; "'ut" should read -- but --.
Column 6, line 45; ":s" should read -- is --.
Column 13, approximately line 50/51; move "n = 1 or 2   m = 0, 1-4   R = H or $C_{1-4}$ alkyl" to column 14 and insert above "Catalyst:" at approximately lines 53/54.
Column 14, line 11; move the parenthesis "(" from the end of line 11 and insert before "chloroethyl)" on line 12.
Column 14, line 13; "tetrabromoor" should read -- tetrabromo or--.
Column 13/14, approximately line 50/51, the formula between "UNSATURATED ACID" and "HYDROXYVINYL ESTER";
change

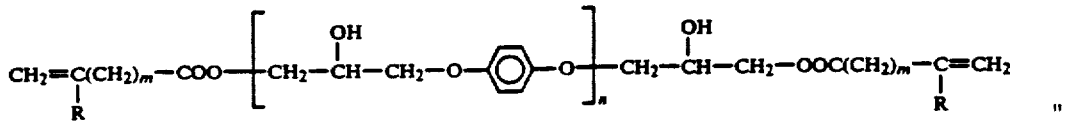

to read as

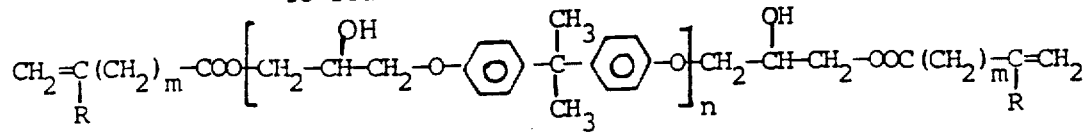

Column 26, EXAMPLE 5 Formulation of Synthetic Wood of V-1233, Column FORMULATION NO., first and second entry (in each instance) (2);"(C.)" should read -- (°C) --.

UNITED STATES PATENT AND TRADEMARK OFFICE
CERTIFICATE OF CORRECTION

PATENT NO. : 5,091,436

DATED : Feb. 25, 1992

INVENTOR(S) : Kurt C. Frisch, Kaneyoshi Ashida

It is certified that error appears in the above-identified patent and that said Letters Patent is hereby corrected as shown below:

Column 26, EXAMPLE 5 Formulation of Synthetic Wood of V-1233,
Column FORMULATION NO., 4th entry; "70 C/post-curing (hr.)"
should read; -- 70° C/post-curing (hrs.) --

Column 28, TABLE 5, line 1; "V-1233 sy" should read
-- V-1233 synthetic wood --.

Column 28, Table 5, line 2; "5.5" x 1" should read
-- 5.5" x 1.0 (in.)$^3$ --.

Column 28, Table 6, line 2; "17" should read -- 17.75 --.

Signed and Sealed this

Sixth Day of July, 1993

Attest:

MICHAEL K. KIRK

*Attesting Officer*     *Acting Commissioner of Patents and Trademarks*